US005522637A

United States Patent [19]
Spears

[11] Patent Number: 5,522,637
[45] Date of Patent: Jun. 4, 1996

[54] AUXILIARY BRAKING PANELS FOR A TRACTOR TRAILER COMBINATION

[76] Inventor: Dan E. Spears, 3515 Westfield Dr., Brandon, Fla. 33511

[21] Appl. No.: 351,800

[22] Filed: Dec. 8, 1994

[51] Int. Cl.⁶ .................................................. B62D 35/00
[52] U.S. Cl. ........................... 296/180.3; 296/180.5
[58] Field of Search ........................ 296/180.1–180.5; 180/903

[56] References Cited

U.S. PATENT DOCUMENTS

| | | | |
|---|---|---|---|
| 4,199,185 | 4/1980 | Woolcock | 296/180.2 |
| 4,693,506 | 9/1987 | Massengill | 296/180.3 |
| 4,824,165 | 4/1989 | Fry | 296/180.3 |
| 4,904,015 | 2/1990 | Haines | 296/180.3 |
| 5,092,648 | 3/1992 | Spears | 296/180.3 |
| 5,222,438 | 6/1993 | Ende | 296/180.1 |
| 5,340,190 | 8/1994 | Engel | 296/180.3 X |

FOREIGN PATENT DOCUMENTS

| | | | |
|---|---|---|---|
| 640839 | 1/1937 | Germany | 296/180.4 |
| 2922130 | 12/1980 | Germany | 296/180.4 |
| 3032042 | 4/1982 | Germany | 296/180.1 |
| 1526860 | 10/1978 | United Kingdom | 296/180.5 |

*Primary Examiner*—Dennis H. Pedder

[57] ABSTRACT

A segmented air deflector for attachment to a tractor, the air deflector having pivotal panels for the selective redirection of air flow to impinge the forward face of a trailer to create drag to exert a braking effect. The selective redirection is provided for by three separate groups of segmented panels being the main pivotal panels, opposing segmented upper side pivotal panels and opposing segmented lower side pivotal panels. The use of wing members either fixed or variably mounted on or about the various panels to condition, and therefore better control wind flow, is taught. Additionally standardized components are disclosed to form segmented air deflectors have various longitudinal lengths for specific installation requirements.

20 Claims, 11 Drawing Sheets

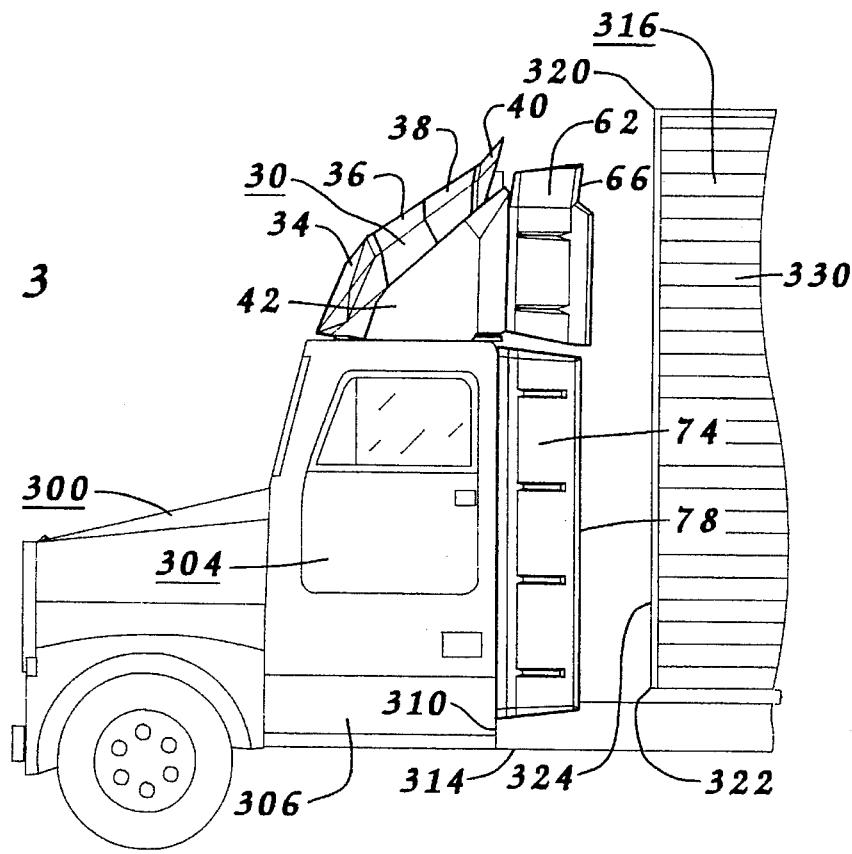
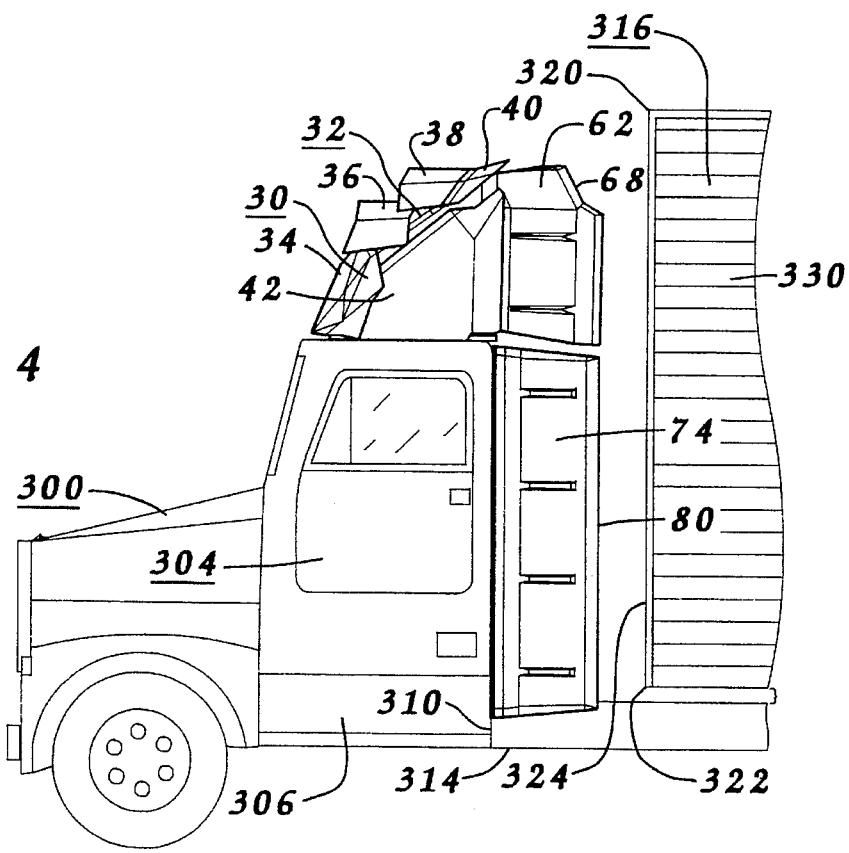

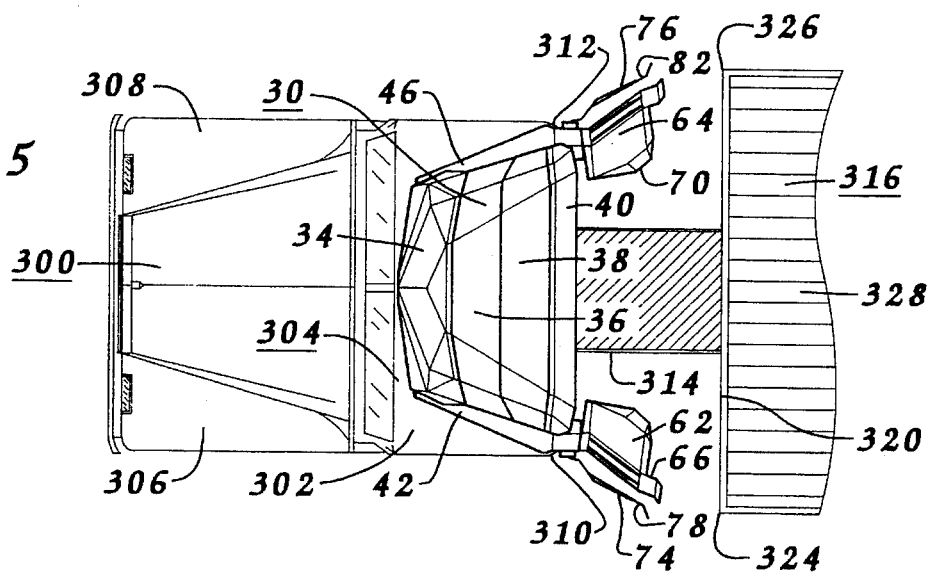
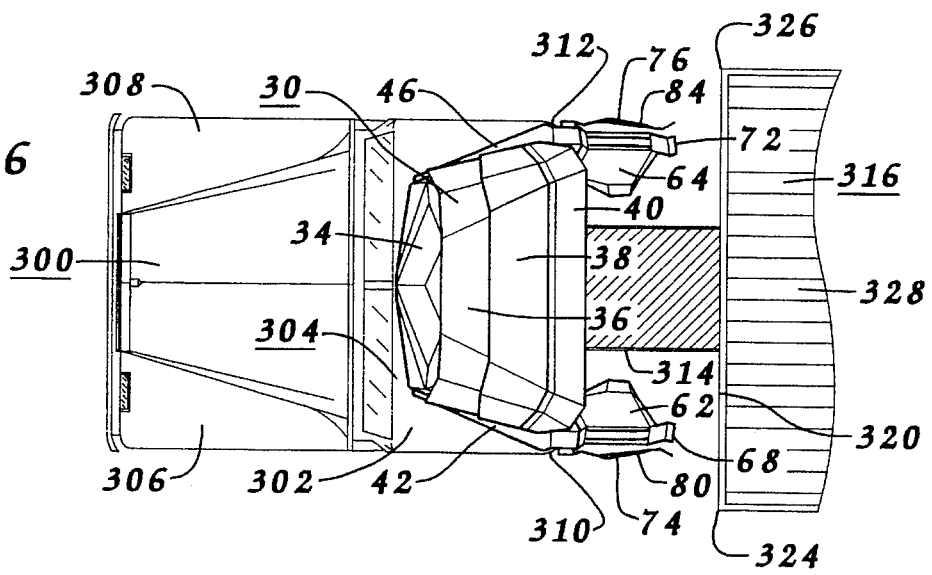

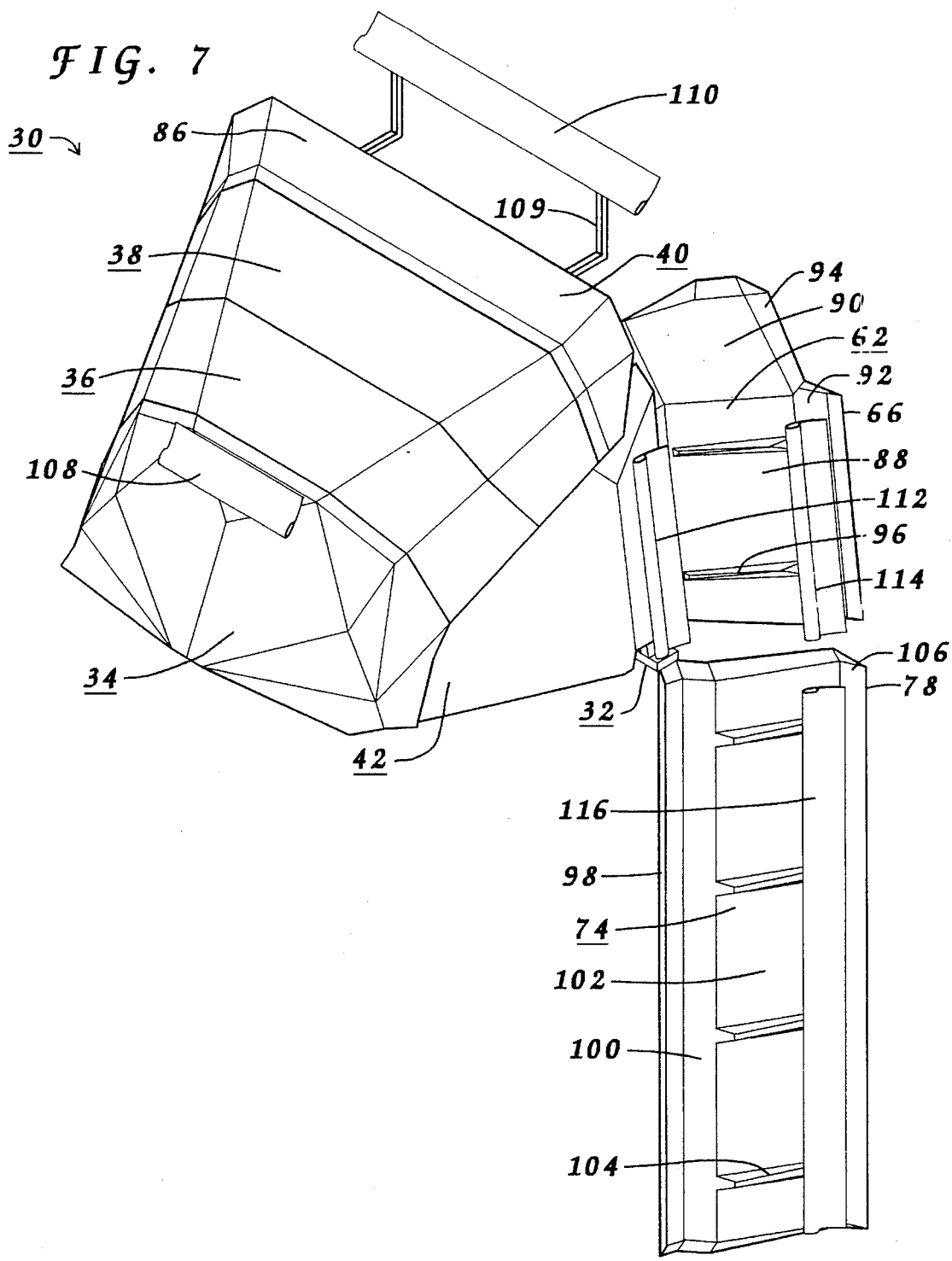

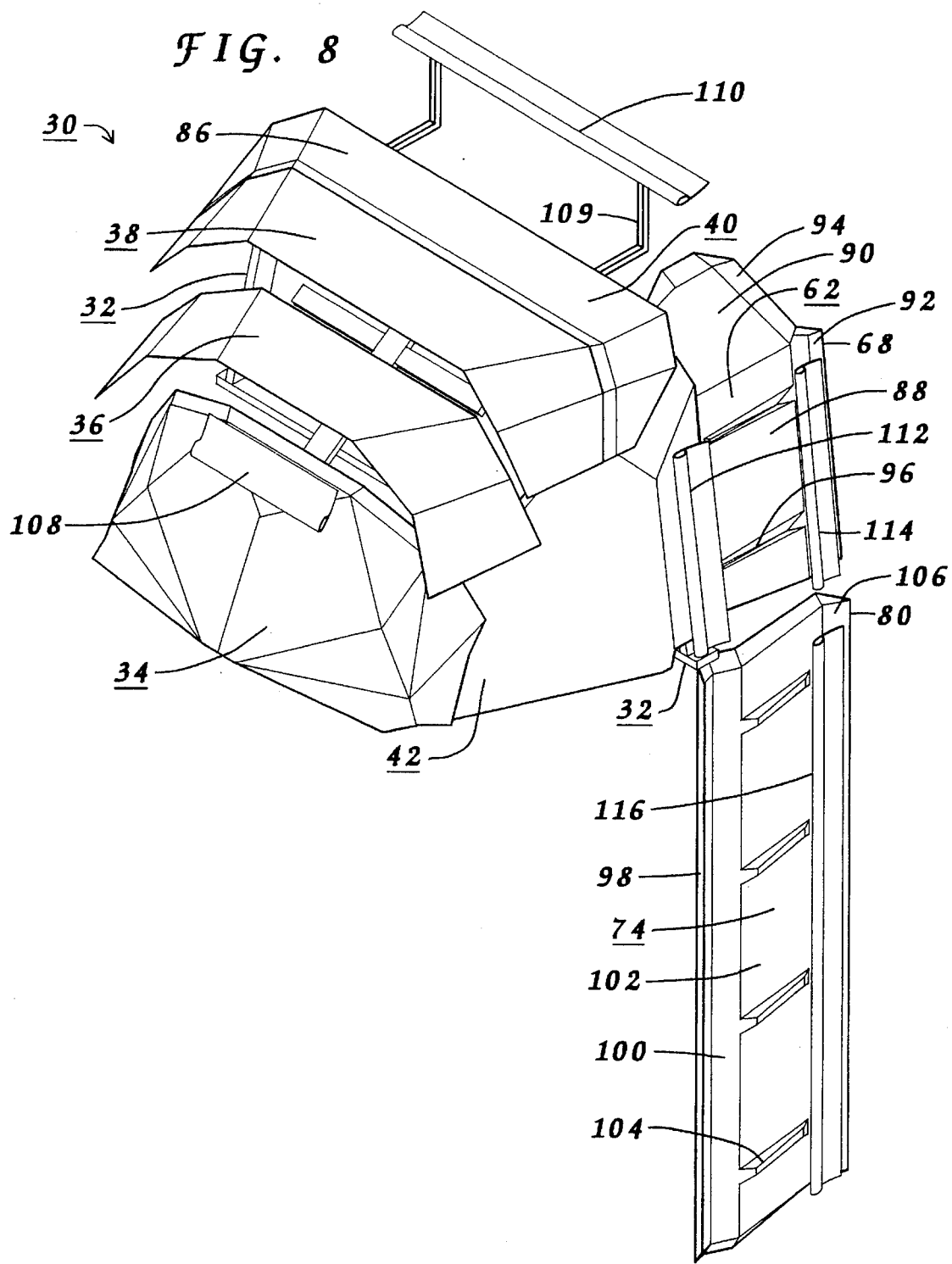

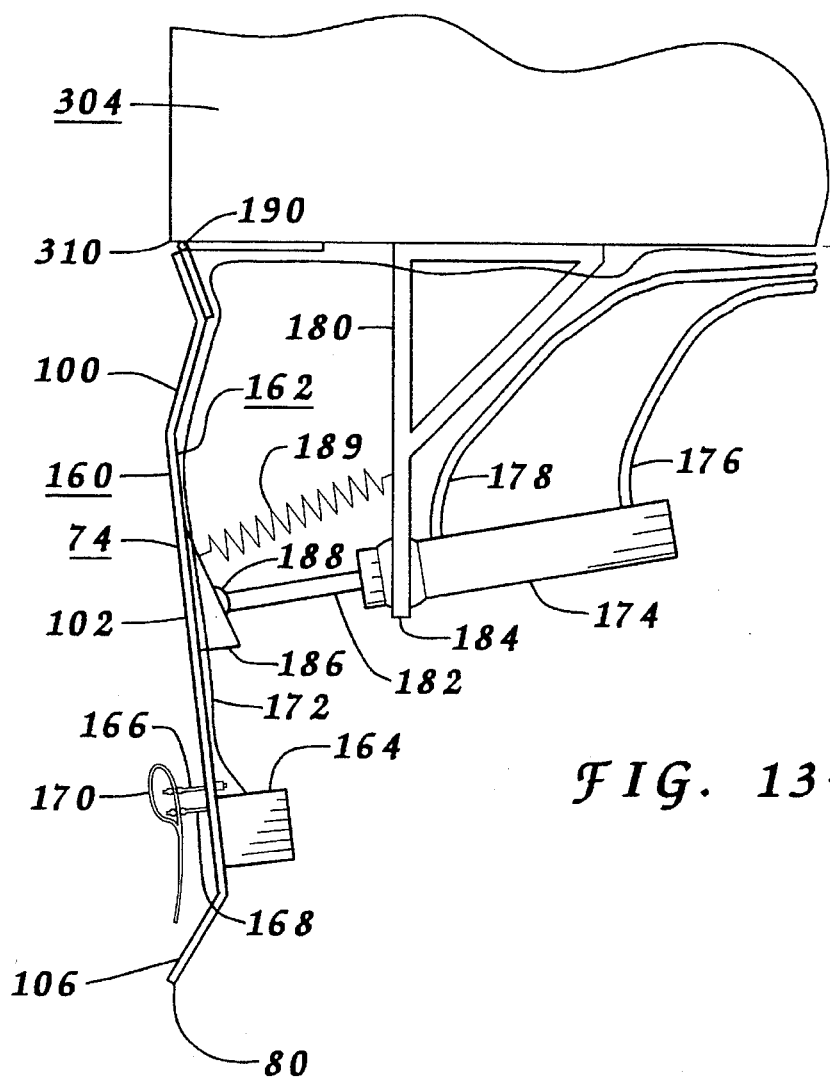
FIG. 13
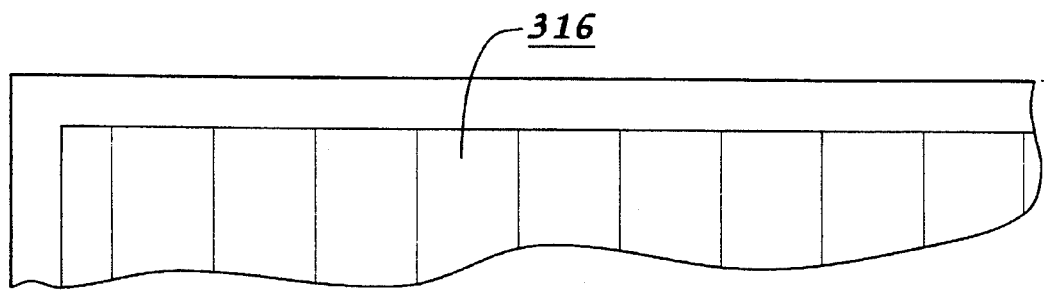

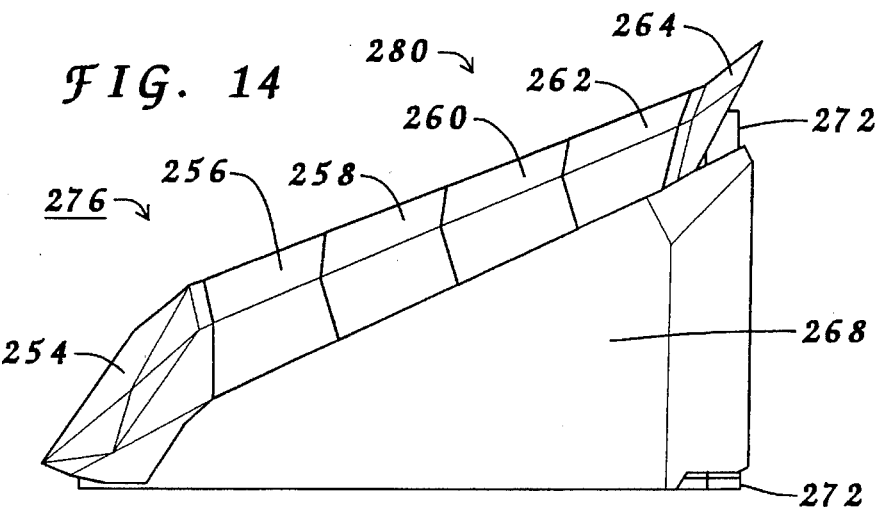
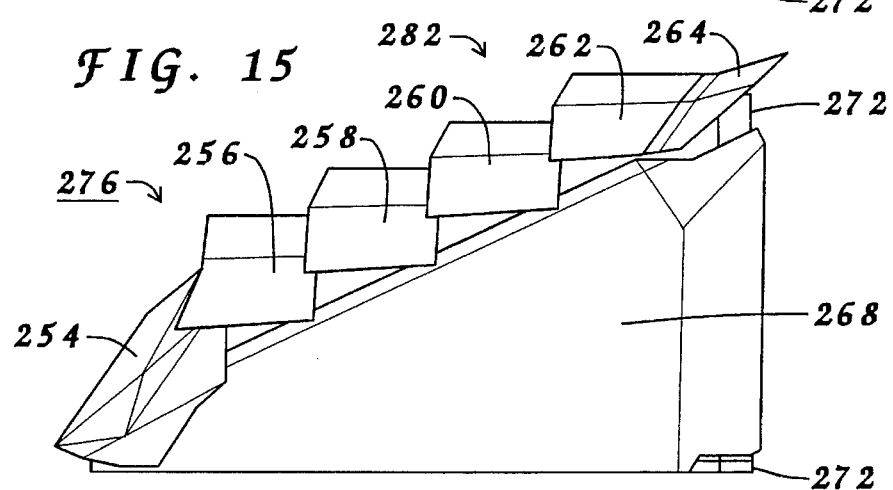
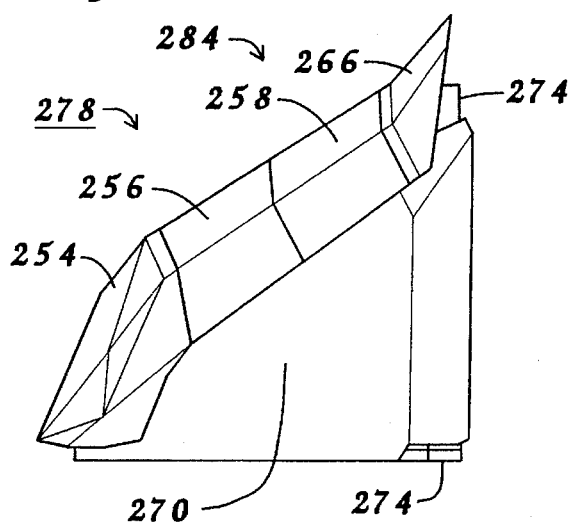
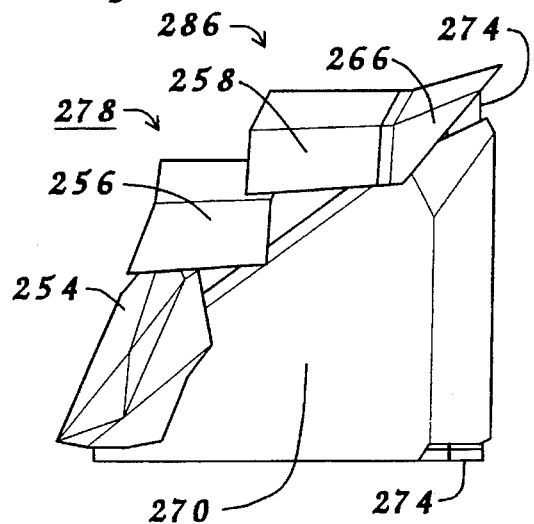

AUXILIARY BRAKING PANELS FOR A TRACTOR TRAILER COMBINATION

BACKGROUND

1. Field of the Invention

This invention relates to selectively creating a braking effect on tractor trailer combinations by providing for the manipulation of various panels on a segmented air deflector from a normal position to streamline the air flow to a position to redirect the air flow to impinge the forward face of the trailer of the tractor trailer combination.

2. Description of the Prior Art

Tractor trailer combinations are plentiful along highways and are utilized to transport vast quantities of materials and goods. The tractor contains a motor, generally diesel fueled, which in turn provides the power which enables the tractor trailer combination to be propelled along a desired path. The trailer provides storage space to house materials and goods and is adaptable for shipment. Both the tractor and the trailer have wheels with brakes associative thereto which act, in a controlled manner, to exert a slowing or stopping action to the revolution of the wheels to decelerate the combination. During such braking the wheels cooperate with the surface of the road being traversed to reduce the forward momentum of the combination. It being recognized that tractor trailer combinations operate in all weather conditions. Brake components have a certain duration of usage beginning with newly installed and eventually requiring replacement. During this duration of usage the effectiveness of the brakes deteriorates. In the art we find structural components, in the form of fairings, which are installed on tractor trailer combinations to streamline the air flow around the tractor trailer combination to reduce drag. This reduction in drag produces a corresponding reduction in consumption of fuel required to move the combination. Several attempts have been made to provide selective redirection of the air flow created by the passage of the tractor trailer combination to create drag during braking. Generally fairings are comprised of a single shell constructed of either fiberglass or a metal alloy and attached to the top of the roof of the tractor. These units are usually specifically designed to be installed on a particular model of tractor. When the fairing is damaged during usage, such as being cracked or otherwise deformed, repairs are difficult. Generally the entire shell must be replaced. Additionally the single shell unit is difficult to transport during the distribution phase following manufacture, as the unit is large, bulky and rigid.

Various attempts have been made to provide fairings with air redirection capabilities to cause the air flow, created by the forward movement of the tractor trailer combination, to selectively impinge the forward face of the trailer to exert a braking force. My prior U.S. Pat. No. 5,092,648, succeeded in addressing this issue to some extent while failing to address several important issues. It is noted that my prior spaced gates were either installed in a single shell unit or in a sectioned or halved shell unit or retrofitted into existing fairings having various corresponding opening formed therein. This effort failed to address several needs including the need for an air deflector which was capable of being shipped in a compact crate for later assembly.

As such, it may be appreciated that there continues to be a need for a segmented air deflector having air flow redirecting abilities to selectively produce drag during braking. Additionally there exists a need for an air deflector versatile enough to fulfill multiple tasks yet capable of being transported in a relatively small crate and assembled at the location of installation. The present invention substantially fulfills these needs.

SUMMARY

In view of the foregoing disadvantages inherent in the known types of fairings, the present invention provides for selective redirection of air flow to create a braking effect on tractor trailer combinations. The term segmented is hereafter used to define sections substantially comprised of plural relatively plane or level, sections definable by relatively sharp edges between the sections. A segmented air deflector formed of a frame system and various attached segmented panels is provided. Several of the segmented panels, in the form of pivotal panels, are hinge mounted relative to the frame. Others, being a front panel and left and right side panels, are rigidly mounted to the frame system. The pivotal panels transverse the segmented air deflector above and to the rear of the front panel. While the pivotal panels are in the closed position they cooperate with the front panel, and the side panels to act as an air fairing. The pivotal panels, in the open position, have as their primary function the redirection of the air flow to impinge upon the forward face of the trailer to cause drag and therefore exert a braking force to the tractor trailer combination. The air flow impinging the forward face of the trailer provides a braking effect resulting in a slowing of the forward momentum of the tractor trailer combination.

Optional left and right segmented upper side pivotal panels are pivotally attached to the rear horizontal sides of the segmented air deflector. The upper side pivotal panels have an extended position and a retracted position. The left and right segmented upper side pivotal panels each have an outward sweeping trailing edge which redirects air flow around the upper section of the facing horizontal front of the trailer while in the extended position. The extended position provides for a streamlining of the combination to reduce drag. The retracted position provides for the air flow to impinge the forward face of the trailer to exert a braking effect.

Optional left and right segmented lower side pivotal panels are pivotally attachable in a vertical orientation at a trailing location on the tractor between the tractor and the trailer. The lower side pivotal panels have an extended position and a retracted position. The left and right segmented lower side pivotal panels have an outward sweeping trailing edge which redirects air flow around the lower section of the facing horizontal front of the trailer while in the extended position. The extended position provides for a streamlining of the combination to reduce drag. The retracted position provides for the air flow to impinge the forward face of the trailer to exert a braking effect.

During braking the segmented side pivotal panels would be caused to retract inward to their respective retracted positions allowing the air flow to impinge the forward face of the trailer, further reducing the forward momentum of the tractor trailer combination.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto, Those skilled in the art will appreciate that the conception, upon which this disclosure is based, may readily be utilized as a basis for the designing of other structures, methods and systems for carrying out the several purposed of the present invention. It is important, therefore, that the claims be regarded as including such equivalent constructions insofar as they do not depart from the spirit and scope of the present invention.

It is therefore an object of the present invention to provide a segmented air deflector formed of a frame system and various segmented panels, the segmented panels forming substantially the entire exterior exposed surface of the segmented air deflector.

It is another object of the present invention to provide for ease of distribution of the segmented air deflector by allowing for assembly of the segmented air deflector to be performed at the location of installation.

It is a further object of the present invention to allow for ease of repair to a damaged segmented air deflector by having the entire exterior exposed surface formed of the various segmented panels, such repair comprising the physical repair of the affected panel or its selective replacement.

An even further object of the present invention to provide three separate air flow redirection panel groups, being the pivotal panels, the left and right segmented upper side pivotal panels and the left and right segmented lower side pivotal panels. This variety will permit varied installation depending upon the configuration of the particular tractor and the envisioned trailers to be employed with the particular tractor.

Yet another object of the present invention is to provide for the panels to be segmented, or formed of substantially flat level areas with sharp definable lines between the various areas, to change the swirling of turbulent wash of air flowing over and past the vehicles forward surface, to further enhance air flow control, increase strength and ensure aesthetic appeal.

Still yet another object of the present invention is to provide for the optional installation of fixed or variable wing members on various selected positions on the segmented air deflector being, the front panel, the pivotal panels, the left and right side panels, the left and right segmented upper side pivotal panels or the left or right segmented lower side pivotal panels. Such placement to condition and better control the direction of the air flow so as to make the air flow more controllable by the segmented air deflector in the various positions.

An even further object of the present invention is to provide for the various panels to mate together when in the closed position so as to provide as smooth a surface as possible providing the least drag possible.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 3 is a side plan view of the illustration of FIG. 1.

FIG. 4 is a side plan view of the illustration of FIG. 2.

FIG. 5 is an overhead plan view of the illustration of FIG. 1 and FIG. 3.

FIG. 6 is an overhead plan view of the illustration of FIG. 2 and FIG. 4.

FIG. 7 is a enlarged perspective view of the various panels as illustrated in

FIG. 1 through FIG. 6 in the closed or extended positions, with various wing members attached thereto.

FIG. 8 is a view as illustrated in FIG. 7 with the various panels in the open or retracted positions.

FIG. 13 is a view as illustrated in FIG. 12 with the panel in the retracted position.

FIG. 14 is a side plan view of another embodiment of a segmented air deflector in the closed position.

FIG. 15 is a view as illustrated in FIG. 14 in the open position.

FIG. 16 is a side plan view of another embodiment of a segmented air deflector in the closed position.

FIG. 17 is a view as illustrated in FIG. 16 in the open position.

DESCRIPTION OF THE PREFERRED EMBODIMENT

Figure 1:
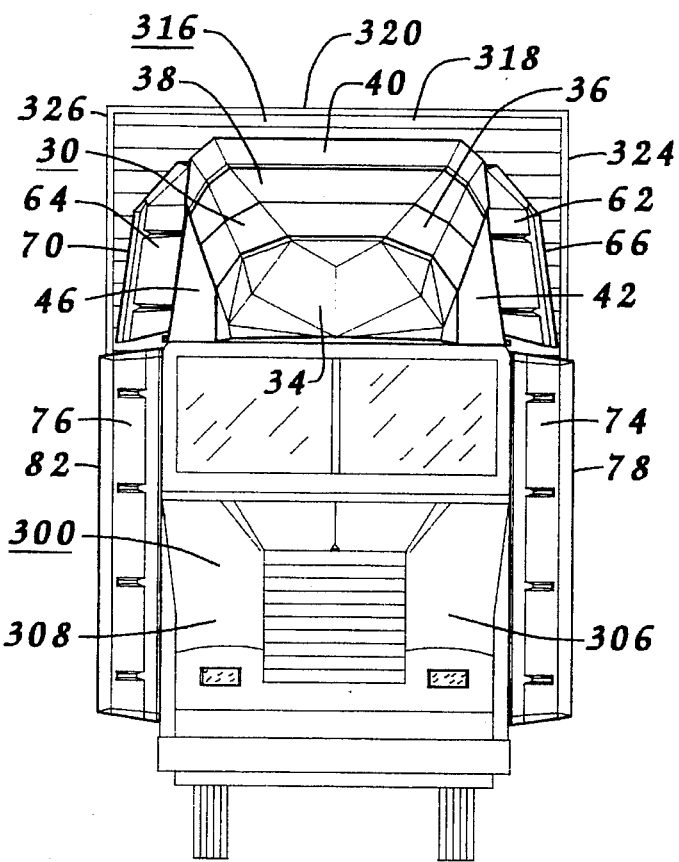
FIG. 1 is a front plan view of a segmented air deflector mounted on a tractor with a trailer attached with the various panels in the closed or extended positions.
Figure 2:
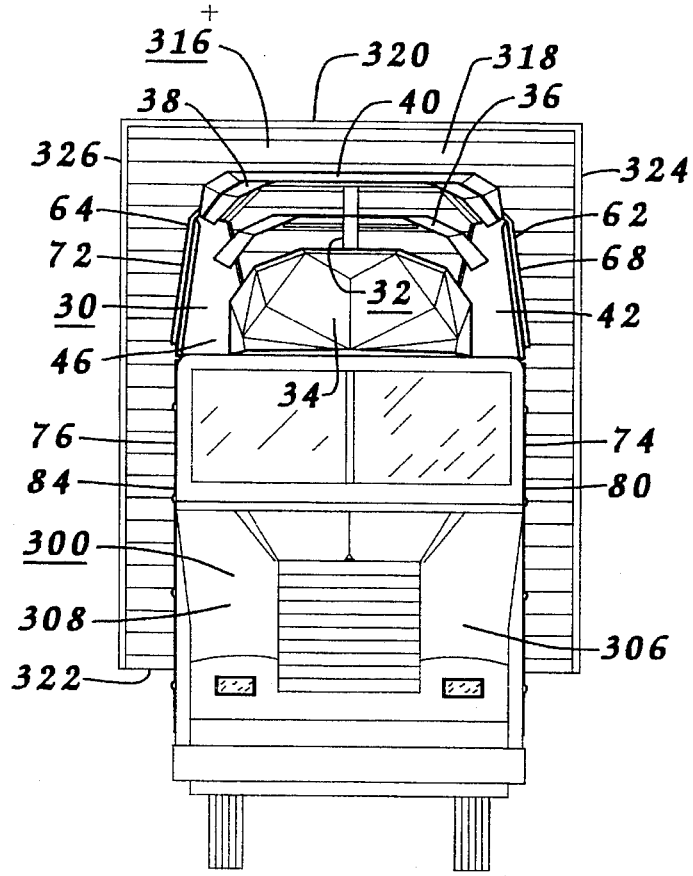
FIG. 2 is a view as illustrated in FIG. 1 with the various panels in the open or retracted positions.

Referring now to the drawings where like reference numerals refer to like parts throughout the various views, and specifically referring to FIG. 1 through FIG. 6 a segmented air deflector 30 is depicted with the various panels in alternating positions. FIG. 1, FIG. 3 and FIG. 5 place all pivotal panels in their respective closed or extended positions while FIG. 2, FIG. 4 and FIG. 6 place all pivotal panels in their respective open or retracted positions. A tractor 300 having a left side 306 and a right side 308 is illustrated having attached thereto, utilizing a connection member 314, a trailer 316. It being understood that tractor 316 has a forward direction of travel and during such travel encounters an air flow which passes around tractor 300 and trailer 318. Tractor 300 has a tractor housing 304 being generally the operator compartment rearward. Trailer 316 has a forward face 318 bordered by an upper edge 320, a lower edge 322, a left side edge 326 and a right side edge 326. Trailer 316 additionally has a roof area 328 and a side area 330. A roof area 302 of tractor 300, as shown in FIG. 5 and FIG. 6, has attached thereto segmented air deflector 30. Segmented air deflector 30 is comprised of a frame system 32, a front panel 34, a first pivotal panel 36, a second pivotal panel 38, a spoiler panel 40, a left side panel 42 and a right side panel 46. While in the closed position, as illustrated in FIG. 1, FIG. 3 and FIG. 5, segmented air deflector 30 acts to streamline the air flow around trailer 316 to reduce drag. While in the open position, as illustrated in FIG. 2, FIG. 4 and FIG. 6, segmented air deflector 30 acts to redirect the air flow to produce drag to exert a braking effect upon the combination of tractor 300 and trailer 316. Hinge mounted to segmented air deflector 30, and extending generally rearwardly, are a left segmented upper side pivotal panel 62 and a right segmented upper side pivotal panel 64. Left segmented upper side pivotal panel 62 has an extended position 66 and a retracted position 68. Right segmented upper side pivotal panel 64 has an extended position 70 and a retracted position 72. While in their respective extended positions, 66 and 70, redirection of air flow around trailer 316 to reduce drag is accomplished. While in their respective retracted positions, 68 and 72, redirection of air flow to impinge forward face 318 of trailer 316 to exert a braking effect is accomplished. Tractor 300 has a left vertically oriented trailing edge 310 and a right vertically oriented trailing edge 312. Hinge mounted to tractor 300, in close proximity to left vertically oriented trailing edge 310, is a left segmented lower side pivotal panel 74 which extends generally rearwardly, Left segmented lower side pivotal panel 74 has an extended position 78 and a retracted position 80. Hinge mounted to tractor 300, in close proximity to right vertically oriented trailing edge 31 2, is a right segmented lower side pivotal panel 76 which extends generally rearwardly. Right segmented lower side pivotal panel 76 has an extended position 82 and a retracted position 84. While in their respective extended positions, 78 and 82, redirection of air flow around trailer 316 to reduce drag is accomplished. While in their respective retracted positions, 80 and 84, redirection of air flow to impinge forward face 318 of trailer 316 to exert a braking effect is accomplished. While the invention is illustrated installed on a tractor having a trailer pivotally and detachably mounted thereto, that van type trucks, having the trailer section rigidly and permanently attached to the tractor section, are applicable to the invention.

It being understood that the greater the velocity of the air flow striking the forward face of the trailer the greater the drag, and therefore the greater the braking force, exerted on the tractor trailer combination. The invention is particularly effective at higher speed, as exampled by speeds above forty mile per hour. It is noted that the efficiency of braking at these higher speeds using conventional brakes is dependent upon the surface being traversed.

FIG. 7 and FIG. 8 provide a more detailed illustration of segmented air deflector 30, left side panel 42, left segmented upper side pivotal panel 62 and left segmented lower side pivotal panel 74 as shown in FIG. 1 through FIG. 6. It being understood that corresponding right side panels have been eliminated for illustrative purposes. FIG. 7 places the various panels in their closed or extended positions while FIG. 8 places the various panels in their open or retracted positions. Front panel 34 and left side panel 42 are rigidly secured to frame system 32. Attached to front panel 34 is a wing 108, either rigidly or variably, which acts to condition and control the air flow. First pivotal panel 36 is pivotally mounted to frame system 32. Second pivotal panel 38 and spoiler panel 40 are rigidly fixed together and pivotally mounted to frame system 32. A frame extension 109 is rigidly attached to frame system 32. Attached to frame extension 109, to the rear of and elevated from spoiler 40, is a wing 110. Wing 110 is mounted, either rigidly or variably, as detailed elsewhere and acts to condition and control the air flow. Wing 110 may be installed to spoiler panel 40, second pivotal panel 38 or first pivotal panel 36. Attached to left side panel 42 is a wing 112, either rigidly or variably, which acts to condition and control the air flow. Left segmented upper side pivotal panel 62 is hinge mounted to segmented air deflector 30 in close proximity to the trailing edge of left side panel 42. Left segmented upper side pivotal panel 62 has extended position 66, shown in FIG. 7, and retracted position 68, shown in FIG. 8. A primary surface 88 directs air flow to a sweeping trailing edge 92 which further directs air flow outwardly. Conditioning risers 96 act to straighten, and therefore condition, the air flow for better control. A secondary surface 90 extends inwardly and is bordered by sweeping trailing edges 94 which further direct air flow upwardly. Attached to left segmented upper side pivotal panel 62 is a wing 114, either rigidly or variably, which acts to condition and control the air flow. Left segmented lower side pivotal panel 74 is illustrated in spacial relationship to the installed positioning. A leading edge 98 is hinge mounted to the tractor as disclosed elsewhere. Left segmented lower side pivotal panel 74 has extended position 78, shown in FIG. 7, and retracted position 80, shown in FIG. 8. A conditioning surface 100 directs air flow to a primary surface 102 which directs air flow to a sweeping trailing edge 106 which further directs air flow outwardly. Conditioning risers 104 act to straighten, and therefore condition, the air flow for better control. Attached to left segmented lower side pivotal panel 74 is a wing 116, either rigidly or variably, which acts to condition and control the air flow.

Figure 9:
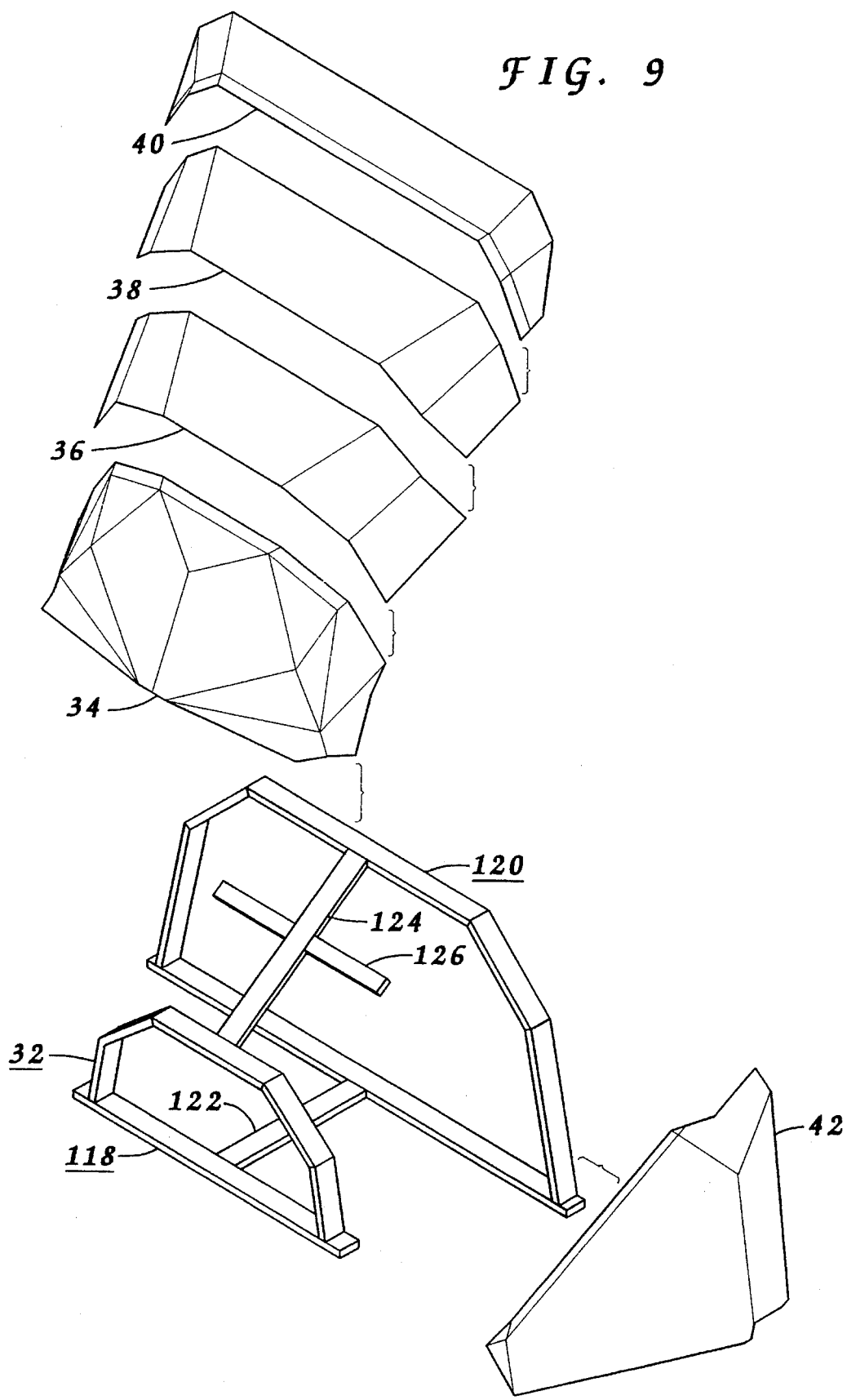
FIG. 9 is an exploded perspective view of a frame system with various panels detached.

FIG. 9 shows frame system 32 which comprises a front frame assembly 118 and a rear frame assembly 120 which are connected, one to the other, by a lower connecting member 122 and an upper connecting member 124. Upper connecting member 124 has attached thereto a cross member 126 for the mounting thereto of a pivotal panel as detailed elsewhere, Shown in lateral alignment to frame system 32 is left side panel 42. It being understood that an opposing right sided panel, corresponding to left side panel 42, would be installed on the opposing side of frame system 32. Front panel 34, first pivotal panel 36, second pivotal panel 38 and spoiler panel 40 are shown in elevational alignment to frame system 32. Following rigid installation of left side panel 42 to frame system 32 front panel 34 would be rigidly installed to front frame assembly 118 of frame system 32 overlapping left side panel 42. First pivotal panel 36 is pivotally secured to cross member 126 of frame system 32 utilizing hinges as disclosed elsewhere. Second pivotal panel 38 is rigidly secured to spoiler panel 40 and the combination is pivotally secured to rear frame assembly 120 of frame system 32 utilizing hinges as disclosed elsewhere. Thus has been disclosed the orientation of the various panels forming the segmented air deflector. In order to provide versatility in the longitudinal length of the resulting segmented air deflector, as detailed below, front frame assembly 118 and rear frame assembly 120 may be connected one to the other utilizing a lower connection member and an upper connection member having different length than illustrated. Thus permitting standardized manufacture of these components.

Figure 10:
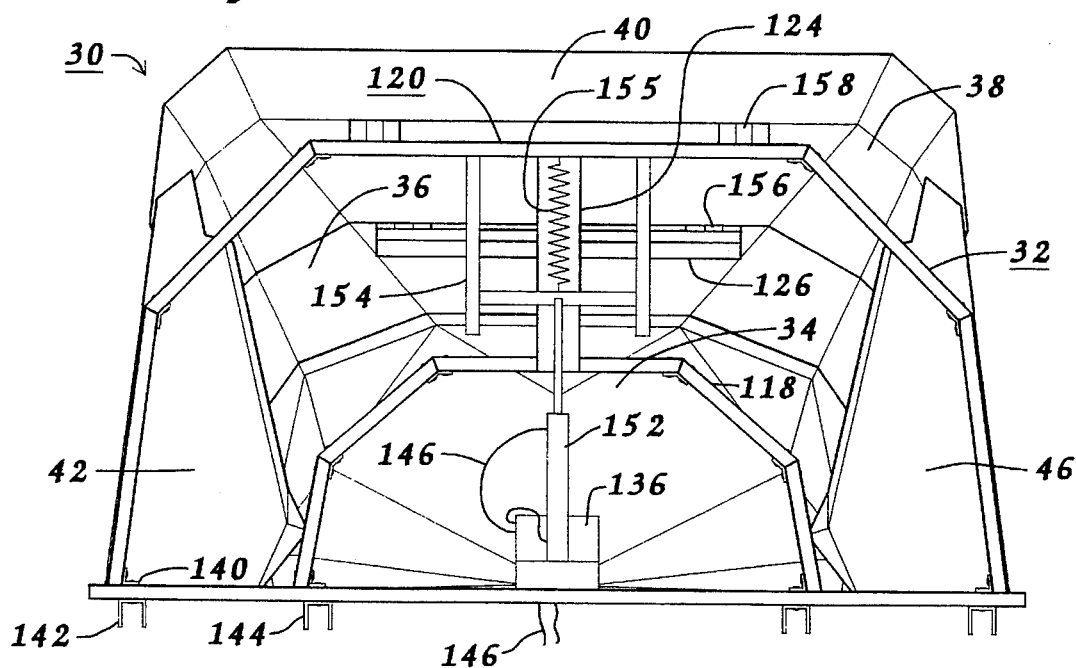
FIG. 10 is a rear plan view of a segmented air deflector with the pivotal panels in the closed positions.
Figure 11:
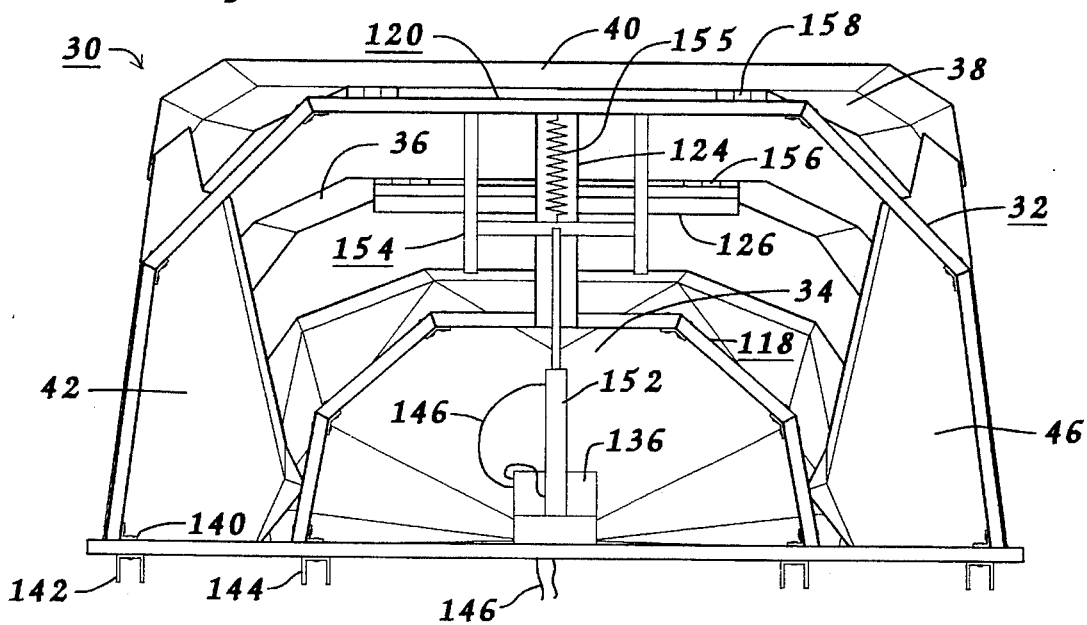
FIG. 11 is a view as illustrated in FIG. 10 with the pivotal panels in the open positions.

FIG. 10 and FIG. 11 illustrate the mechanical components utilized to operate segmented air deflector 30. Front frame assembly 118 and rear frame assembly 120 are each formed of various framing material rigidly secured together by brackets 140 and are connected one to the other by lower connecting member, not shown, and upper connecting member 124. Securely attached to opposing lower corners of front frame assembly 118 are a pair of front mounting brackets 144. Securely attached to opposing lower corners of rear frame assembly 120 are a pair of rear mounting brackets 142. Rear mounting brackets 142 and front mounting brackets 144 cooperate to secure segmented air deflector 30 to tractor 300 as illustrated in FIG. 1 through FIG. 6 and known in the art. Front panel 34 is shown secured to frame system 32. First pivotal panel 36 is secured to cross member 126 utilizing hinges 156 and connected to a coupling unit 154. Spoiler panel 40 is securely attached to second pivotal panel 38 and the combination is secured to rear frame assembly 120 utilizing hinges 158 and connected to coupling unit 154. Coupling unit 154 provides for synchronized transfer of first pivotal panel 36 and second pivotal panel 38, with attached spoiler panel 40, between a closed position, shown in FIG. 10, and an open position, shown in FIG. 11. A spring 155 provides for coupling unit 154 to place the associative panels in the open position, as shown in FIG. 11, if control panel 136 fails to provide control thereover. Spring 155 therefore provides that in the event of an emergency, such as loss of air pressure, that a braking effect will be exerted on the tractor trailer combination as a safety feature. Left side panel 42 is secured to frame system 32. Right side panel 6 is secured to frame system 32. Control panel 136 is secured to lower connecting member, not shown, and receives air pressure through air lines 146. Control panel 136 receives signals and acts upon those signal as detailed elsewhere. A main pneumatic drive 152 acts upon coupling unit 154 to transfer first pivotal panel 36, second pivotal panel 38 and spoiler panel 40 between the closed position, shown in FIG. 10, and the open position, shown in FIG. 11. Control panel 136 similarly controls the various drive means controlling the respective segmented upper side pivotal panels and the respective segmented lower side pivotal panels as well as the electrical operation of the variable wing members as detailed elsewhere.

Figure 12:
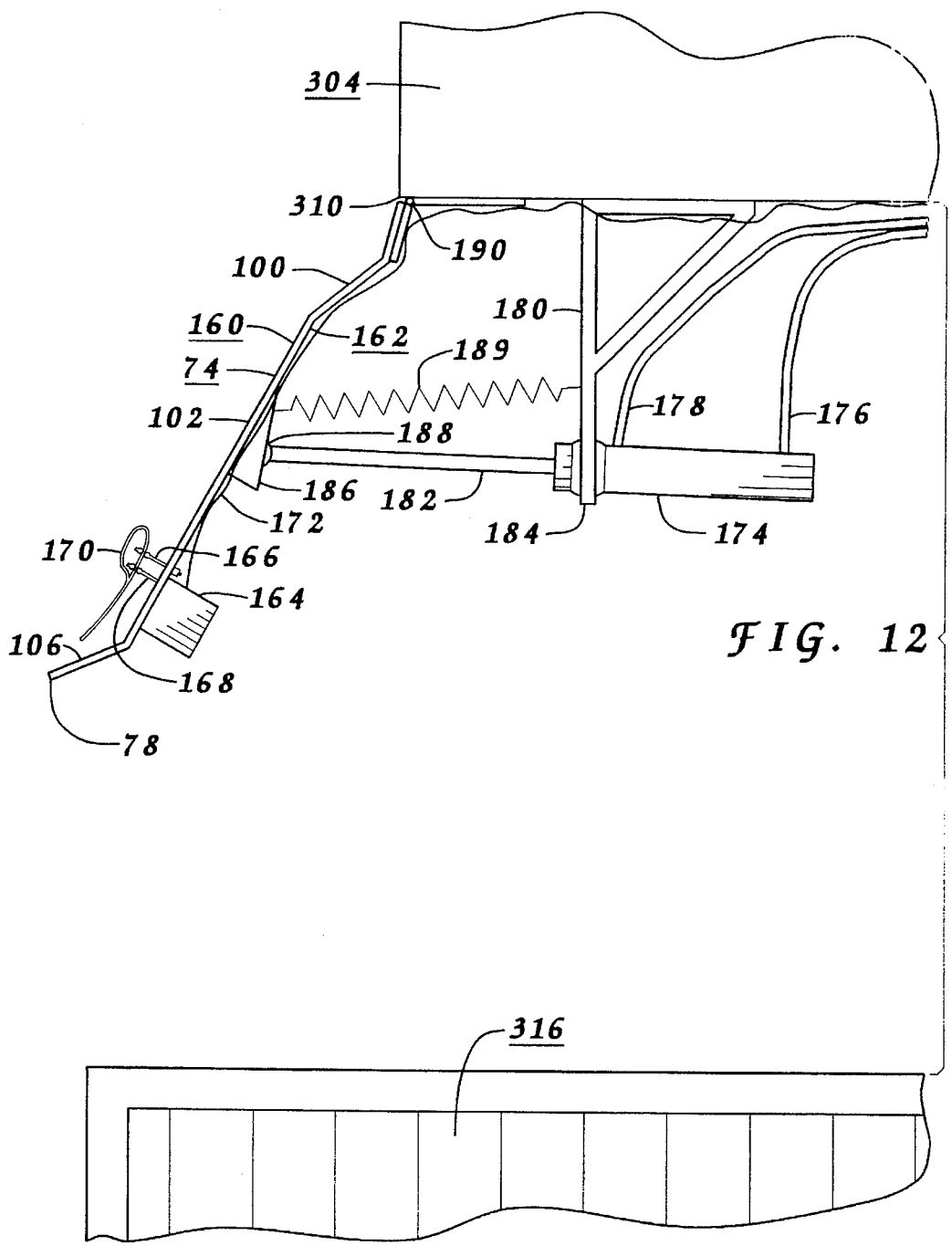
FIG. 12 is an overhead plan view of a left segmented lower pivotal panel in the extended position with a variable wing member attached.

FIG. 12 and FIG. 13 depict the structural installation and the mechanical operation of left segmented lower side pivotal panel 74. Identical adaptation is employed, with a reversal of structure, to install and operate right segmented lower side pivotal panel 64, illustrated in FIG. 1 through FIG. 6. Similar mechanical operation is employed to operate left and right segmented upper side pivotal panels 62 and 64 similarly illustrated in FIG. 1 through FIG. 6 with mounting taking place to either frame system 32 or left and right side panels 42 and 46. Left segmented lower side pivotal panel 74 is pivotally mounted to tractor housing 304 in close proximity to left rear vertically oriented trailing edge 310 utilizing hinge 190. Hinge 190 preferably extends the length of left segmented lower side pivotal panel 74 although multiple hinges 190 may be deployed in spaced relationship along such length. A bracket 180 is securely mounted to tractor housing 304. Bracket 180 has a pivotal connection 184 which secures a pneumatic drive 174 having a linkage 182. Pneumatic drive 174 is adaptable to extend and retract linkage 182 utilizing air pressure supplied through air line 176 and air line 178. Linkage 182 terminates distal from pneumatic drive 174 in a connector 188 which is seated in a attachment coupling 186. Attachment coupling 186 is secured to left segmented lower side pivotal panel 74 as conventionally known in the art. Left segmented lower side pivotal panel 74 has extended position 78, shown in FIG. 12, and retracted position 80, shown in FIG. 13. Pneumatic drive 174 causes transfer of left segmented lower side pivotal panel 74 between extended position 78 and retracted position 80. A spring 189 provides for the placement of left segmented lower side pivotal panel 74 into retracted position 80, shown in FIG. 13, if pneumatic drive 174 fails to provide control thereover. Spring 189 therefore provides a safety feature in the advent of an emergency, such as the loss of air pressure, to create a drag to slow the tractor trailer combination. It being understood that all respective upper or lower segmented side pivotal panels have similar structural features to provide for deployment to the respective retracted positions when normal control fails to be provided. Left segmented lower side pivotal panel 74 has an outer surface 160 and an inner surface 162. Outer surface 160 is comprised of conditioning surface 100 which transfers air flow to primary surface 102 which transfers air flow to sweeping trailing edge 106 to direct air flow around trailer 316 when in extended position 78. Attached to inner surface 162 is a solenoid 164, which is electrically operated utilizing wire 172, which causes extension and retraction of a solenoid linkage 168. A wing 170 is pivotally extended from outer surface 160 by a extending pivotal support member 166 and thus secured to left segmented lower side pivotal panel 74. Wing 170 is coupled to solenoid linkage 168 and thus is pivotally movable by solenoid 164 relative to outer surface 160. It being understood the a plurality of extending pivotal support members 166 would be deployed in spaced relationship along the length of wing 170.

FIG. 14, FIG. 15, FIG. 16 and FIG. 17 illustrate the versatility of the panel system used to construct the various segmented air deflectors 276 and 278. A front panel 254, a first panel 256 and a second panel 258 are utilized for both segmented air deflector 276 and segmented air deflector 278.

FIG. 14 and FIG. 15 show segmented air deflector 276 having a longitudinal length sufficient for installation on a tractor having a sleeper compartment. Front panel 254 is rigidly attached to frame system 272. First panel 256 and second panel 258 are pivotally attached to frame system 272. Within this embodiment a third panel 260, a fourth panel 262, with a spoiler panel 264 rigidly attached thereto, are pivotally attached to frame system 272. A left side panel 268 is rigidly attached to frame system 272. It being understood that the right side of segmented air deflector 276 similarly has a panel rigidly attached thereto. FIG. 14 shows segmented air deflector 276 it a closed position 280 while FIG. 15 illustrates an open position 282. While in closed position 280 segmented air deflector 276 acts as a fairing to streamline air flow while in open position 282 air deflector 276 acts to redirect air flow as detailed elsewhere.

FIG. 16 and FIG. 17 show segmented air deflector 278 having a longitudinal length sufficient for installation on a standard tractor not having a sleeper compartment. Front panel 254 is rigidly attached to frame system 274. First panel 256 and second panel 258, with a spoiler panel 266 rigidly attached thereto, are pivotally attached to frame system 274. A left side panel 270 is rigidly attached to frame system 274. It being understood that the right side of segmented air deflector 278 similarly has a panel rigidly attached thereto. FIG. 16 shows segmented air deflector 278 it a closed position 284 while FIG. 17 illustrates an open position 286. While in closed position 284 segmented air deflector 278 acts as a fairing to streamline air flow while in open position 286 air deflector 278 acts to redirect air flow as detailed elsewhere.

Thus it is understood that by having standardized panels various segmented air deflectors can be assembled for specific installations. While two and four panels have been used for illustrative purposes, other specific numbers are possible. As detailed elsewhere the longitudinal length of the frame member may be varied while retaining uniformly sized front members and rear members.

Various materials may be used to form the individual panels utilizing any method known in the art. A particularly expedient method utilizes molds to form the panels from a resin reinforced by fiberglass sheet material. The resulting panels are strong, lightweight, easily drilled for attachment, will not rust and have a resulting surface that is easy to paint. The number of separate molds to provide installation of two, three or four door units, given for example and not limitation, requires fourteen molds. One mold for the universal front panel, four separate molds for the pivotal panels, three separate molds for the three possible spoiler panels, and six separate molds for the three possible pairs of side panels.

Figure 18:
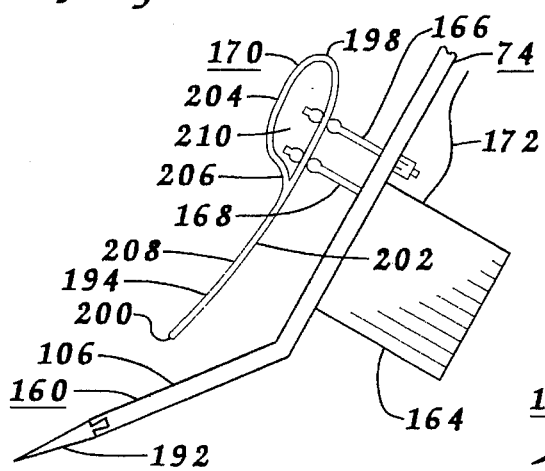
FIG. 18 is an overhead plan view of a variable wing member in the retracted position.
Figure 19:
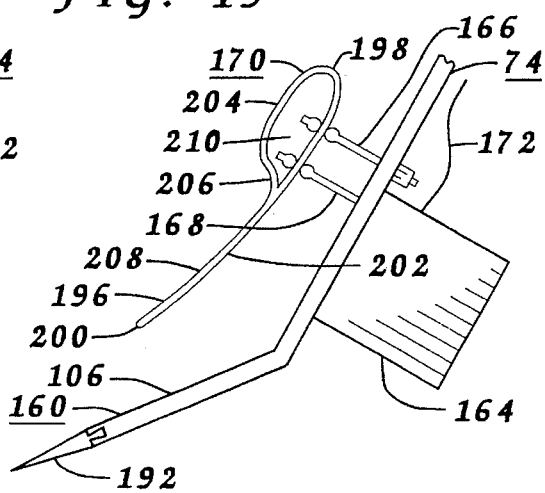
FIG. 19 is a view as illustrated in FIG. 18 with the wing member in the extended position.

FIG. 18 and FIG. 19 show wing 170 attached to outer surface 160 of left segmented lower side pivotal panel 74 utilizing extending pivotal support member 166. Solenoid linkage 168 is terminally attached to wing 170 spaced laterally from extending pivotal support member 166. In this particular embodiment wing 170 has an interior 210 wherein such attachment terminate. Solenoid linkage 168 is controllable by solenoid 164, which is electrical and controlled by wire 172. Wing 170 has a leading edge 198 and a trailing edge 200. A convex surface 202 extends between leading edge 198 and trailing edge 200 adjacent to outer surface 160. An opposing convex surface 202 extends from leading edge 198 and terminates in a transition surface 206, which is concave in shape, which terminates in a concave surface 208 which extends to trailing edge 200. Wing 170 has a retracted position 194, shown in FIG. 18 and an extended position 196, shown in FIG. 19 and represents a range of pivotal motion. Retracted position 194 places trailing edge 200 at the closest measurement to outer surface 160 of the range of motion while extended position 196 places trailing edge 200 at the farthest distance to outer surface 160 of the range of motion. It being understood that such variable operation of wing 170 is applicable to all wings disclosed regardless of the specific panel installed upon. Generally the particular wing would be in the extended position when the carrier panel is in its respective extended position or closed position and in the retracted position when the carrier panel is in its respective retracted position or open position. While the orientation of wing 170 illustrates the preferred installation, certain installations, depending upon location of installation, may place wing 170 reversed with convex surface 202 away from the attachment surface. A flexible extension member 192, preferably made of a rubberized material, is shown installed to the terminal end of left segmented lower side pivotal panel 74. It being understood that flexible extension member 192 would also be install on right segmented lower side pivotal panel and would extend the length of the respective panel. Protection during contact with other objects, for both the panel and the impacting object, is provided.

Figure 20:
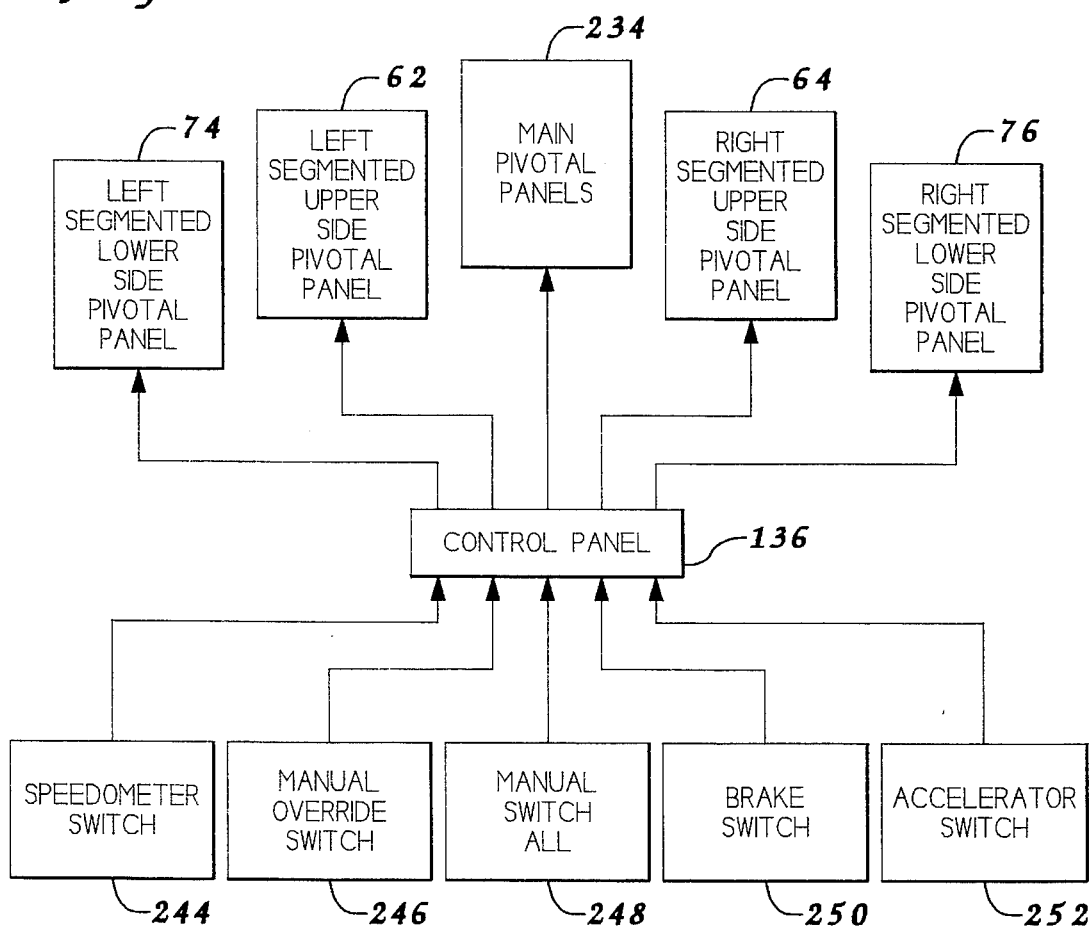
FIG. 20 is a flow chart illustrating the activation sequences to control the various panels.

FIG. 20 illustrates, with graphical representations, one possible adaptation of controlling the various panels. It being understood that several combinations exist. It being understood that each panel, or panel group in the case of main pivotal panels 234, has opposing positions, being either extended and retracted or closed and open, as detailed elsewhere. Control panel 136 receives input from various sources, as detailed below, and causes transfer of the various individual panels. It being further understood that the various variable wings would be transferred simultaneously with the respective panel associated therewith. The preferred mechanical structure has the panels being transferred between their opposing positions by pneumatic drives while the variable wings are transferred between their opposing positions by electric solenoids. It is understood that control panel 136 encompasses the physical structure to facilitate such transfers as is conventionally known in the art. Main pivotal panels 234 are hereby disclosed as referring to first pivotal panel 36 and second pivotal panel 38 with spoiler panel 40 attached thereto. While two pivotal panels have been disclosed in the principal embodiment, other combinations exist depending upon specific requirements of the subject vehicle. Tractors with sleeper compartments would accept segmented air deflectors have a greater longitudinal length, as exampled in FIG. 16 and FIG. 17. When additional pivotal panels are deployed all such pivotal panels are simultaneously transferred. During normal conditions control panel 136 places main pivotal panels 234 in their closed position, left segmented upper side pivotal panel 62, right segmented upper side pivotal panel 64, left segmented lower side pivotal panel 74 and right segmented lower side pivotal panel 76 in their extended positions. This provides for a streamlining of the vehicle and reduces drag during forward motion. The following description of activation places all panels originally in the positions detailed above for normal conditions it being understood that when the various signals indicated below stop being sent to control panel 136, control panel 136 will cause the effected panel or panels to be returned to their respective normal condition positions. As detailed elsewhere, a safety feature provides for main pivotal panels 234 to be placed in the open position and left segmented upper side pivotal panel 62, right segmented upper side pivotal panel 64, left segmented lower side pivotal panel 74 and right segmented lower side pivotal panel 76 to be placed in their respective retracted positions when control panel 136 fails to provide control thereover or mechanically fails to be able to provide such control, such as during a loss of air pressure. Preferably transfer to the open or retracted positions would only be facilitated when the tractor trailer combination is traveling at a speed sufficient to justify such transference. It being noted that at lower speed, as exampled by less than about 30 mile per hour, the brakes are sufficient to adequately control and stop the vehicle. A speedometer switch 244 is provided which would monitor the speed of the vehicle and activate control panel 136 to allow transference of the various panels to their respective open or retracted positions when the speed of the vehicle is above a predetermined minimum, such as above 30 mile per hour. Manual override switch 246 and manual switch all 248 are physical switches located in the operator compartment of tractor 300, shown in FIG. 1 through FIG. 6, and are selectively activated and deactivated by the vehicle operator, as conventionally known in the art. When engaged, manual override switch 246 prevents control panel 136 from transferring the various panels to their respective open or retracted positions. When disengaged, as during normal conditions, manual override switch 246 allows control panel 136 to exercise control over the transference of the various panels between their respective alternating positions. When engaged, manual switch all 248 causes control panel 136 to place the various panels into their respective open or retracted positions. When disengaged, as during normal conditions, manual switch all 248 exercises no control over control panel 136. It being noted that when tractor 300 is in transit without an accompanying trailer 316 manual switch 248 would be engaged to place the various panels in their respective open or retracted positions to reduce drag. Manual override switch 246 and manual switch all 248 afford the vehicle operator greater control over the auxiliary braking device. It being noted that there exist two basic indicating factors that the operator of a vehicle desire to decelerate. The first is the removal of the operators foot from the accelerator pedal. It being noted that while a gradual slowing of the vehicle will result in most occasions deceleration may not be the desired effect, but rather simple a temporary elimination of acceleration. The second, and a more certain indication of a desire by the operator to decelerate, is the application of pressure on the brake pedal by the vehicle operator. It being noted that accelerator pedals and brake pedals are well known in the art. A brake switch 250 and an accelerator switch 252 are represented as would be attached to the respective physical pedals, or related couplings, as conventionally known in the art. It being noted that a selected one of the two would be deployed for each installation. Brake switch 250 would transfer a signal to control panel 136 that pressure was being applied to the brake pedal. Control panel 136 would then cause main pivotal panels 234, left segmented upper side pivotal panel 62, right segmented upper side pivotal panel 64, left segmented lower side pivotal panel 74 and right segmented lower side pivotal panel 76 to be placed in their respective open or retracted positions. Brake switch 250 would then transfer a signal to control panel 136 that the prior pressure was no longer being applied to the brake pedal when the vehicle operator terminates such application. Control panel 136 would then cause main pivotal panels 234, left segmented upper side pivotal panel 62, right segmented upper side pivotal panel 64, left segmented lower side pivotal panel 74 and right segmented lower side pivotal panel 76 to be placed in their respective closed or extended positions. Thus when the operator engages the vehicle's conventional brakes, the various panels would be transferred to cause redirection of the air flow to impinge the forward face of the trailer to exert a braking force. Accelerator switch 252 would transfer a signal to control panel 136 indicating whether or not pressure was being applied to the accelerator pedal. Control panel 136 would then cause main pivotal panels 234, left segmented upper side pivotal panel 62, right segmented upper side pivotal panel 64, left segmented lower side pivotal panel 74 and right segmented lower side pivotal panel 76 to be placed in their respective open or retracted positions when such pressure was terminated. Accelerator 252 would then transfer a signal to control panel 136 that pressure was once again being applied to the accelerator pedal when the vehicle operator resumed such application. Control panel 136 would then cause main pivotal panels 234, left segmented upper side pivotal panel 62, right segmented upper side pivotal panel 64, left segmented lower side pivotal panel 74 and right segmented lower side pivotal panel 76 to be placed in their respective closed or extended positions. Thus when the operator terminates engagement of the vehicle's accelerator pedal, the various panels would be transferred to cause redirection of the air flow to impinge the forward face of the trailer to exert a braking force. A simple timing device, as known in the art, could permit delayed transference to the open or retracted positions to prevent unnecessary transference; such as during shifting upward through the gears.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling with the scope of the invention.

I claim:

1. A segmented air deflector for a tractor, the tractor adaptable to tow a trailer, the tractor and the trailer forming a tractor trailer combination, the tractor having a roof area, a direction of forward travel, a left and right directional orientation corresponding to a position facing forward in the direction of forward travel of the tractor, an imaginary center line extending through the tractor corresponding to the direction of forward travel, a tractor housing, a left rear vertically oriented trailing edge of the tractor housing, a right rear vertically oriented trailing edge of the tractor housing, the trailer having a forward face, the segmented air deflector attachable to the roof area of the tractor, the segmented air deflector having a directional orientation following attachment, the directional orientation including left, right, forward and rear and corresponding to the directional orientation of the tractor, the segmented air deflector comprising:

a) a frame system;
   b) a front segmented panel having a plurality of planar outer surfaces and rigidly attached to the frame system and substantially forming the front of the segmented air deflector;
   c) a plurality of segmented pivotal panels pivotally attached to the frame system in close proximity to the front segmented panel and extending rearward and upward from the front segmented panel, each segmented pivotal panel having a plurality of planar outer surfaces with a linear juncture between adjoining surfaces each segmented pivotal panel having alternating positions, the alternating positions being a closed position and an open position;
   d) a right side segmented panel having a plurality of planar outer surfaces and rigidly attached to the frame system and substantially filling the area between the segmented pivotal panels and the tractor on the right side of the segmented air deflector;
   e) a left side segmented panel having a plurality of planar outer surfaces and rigidly attached to the frame system and substantially filling the area between the segmented pivotal panels and the tractor on the left side of the segmented air deflector;
   f) a drive means to provide for a selective transference of the segmented pivotal panels between the alternating positions;
   g) a control means to provide for a selective activation of the drive means to cause transference of the segmented pivotal panels between the alternating positions;
   the segmented air deflector providing fairing characteristics to stream line air flow around the trailer during motion of the tractor trailer combination to reduce drag while the segmented pivotal panels are in the closed position, the segmented air deflector having a continuous segmented surface area comprising a plurality of planar surfaces formed by the front segmented panel, the segmented pivotal panels, the right side segmented panel and the left side segmented panel while the segmented pivotal panels are in the closed position, the segmented air deflector providing redirection of the air flow to impinge the forward face of the tractor to produce drag by exerting a braking force on the tractor trailer combination while the segmented pivotal panels are in the open position;

whereby the segmented air deflector acts as a fairing to stream line air flow around the trailer while the segmented pivotal panels are in the closed position and redirects the air flow to impinge the forward face of the trailer to create drag while the segmented pivotal panels are in the open position.

2. The segmented air deflector defined in claim 1 further comprising:

a) a wing member having:
  1) a leading edge;
  2) a trailing edge;
  3) a first surface having a convex shaped and extending from the leading edge to the trailing edge;
  4) a second surface comprising:
    a) an opposing convex surface extending from the leading edge on an opposing side from the first surface;
    b) a transition surface being concave shaped;
    c) a concave surface extending from the transition surface to the trailing edge, the transition surface being between the opposing convex surface and the concave surface;
b) attachment means to provide for elevated placement of the wing member above an attachment surface, the attachment surface an exposed surface of the segmented air deflector;

whereby the wing member is attached to the segmented air deflector and provides additional conditioning of the air flow.

3. The segmented air deflector defined in claim 2 wherein the wing member is positioned transversely to one of the segmented pivotal panels to aid in conditioning of the air flow.

4. The segmented air deflector defined in claim 2 wherein opposing wing members are positioned relatively vertically on each of the opposing segmented side panels in close proximity to the respective rear trailing edge to aid in conditioning of the air flow.

5. The segmented air deflector defined in claim 2 further comprising pivotal variation means to provide for selective alteration of an angle of attack of the wing member to aid in conditioning of the air flow.

6. The segmented air deflector defined in claim 1 wherein the control means further provides for monitoring for the presence of pressure on a brake pedal, the brake pedal engagable by the operator to activate the brakes of the tractor trailer combination, the pressure applied to the brake pedal causing transference of the segmented pivotal panels to the open position to redirect the air flow to impinge the forward face of the trailer to create drag to exert a braking force.

7. An auxiliary braking device for a tractor, the tractor adaptable to tow a trailer, the tractor and the trailer forming a tractor trailer combination, the tractor having a roof area, a direction of forward travel, a left and right directional orientation corresponding to a position facing forward in the direction of forward travel of the tractor, an imaginary center line extending through the tractor corresponding to the direction of forward travel, a tractor housing, a left rear vertically oriented trailing edge of the tractor housing, a right rear vertically oriented trailing edge of the tractor housing, the trailer having a forward face, the auxiliary braking device attachable to the roof area of the tractor, the auxiliary braking device having a directional orientation following attachment, the directional orientation including left, right, forward and rear and corresponding to the directional orientation of the tractor, the auxiliary braking device comprising:

a) a segmented air deflector comprising:
  1) a frame system;
  2) a front segmented panel having a plurality of planar outer surfaces and rigidly attached to the frame system, the front segmented panel substantially forming the front of the segmented air deflector;
  3) a plurality of segmented pivotal panels pivotally attached to the frame system in close proximity to the front segmented panel and extending rearward and upward from the front segmented panel, each segmented pivotal panel having a plurality of planar outer surfaces with a linear juncture between adjoining surfaces each segmented pivotal panel having alternating positions, the alternating positions being a closed position and an open position;
  4) a right side segmented panel having a plurality of planar outer surfaces and rigidly attached to the frame system and substantially filling the area between the segmented pivotal panels and the tractor on the right side of the segmented air deflector, the right side segmented panel having a rear trailing edge;
  5) a left side segmented panel having a plurality of planar outer surfaces and rigidly attached to the frame system and substantially filling the area between the segmented pivotal panels and the tractor on the left side of the segmented air deflector, the left side segmented panel having a rear trailing edge;
  6) a main drive means to provide for a selective transference of the segmented pivotal panels between the alternating positions;
b) a right segmented upper side pivotal panel having a plurality of planar outer surfaces and attached in close proximity to the rear trailing edge of the right side segmented panel, the right segmented upper side pivotal panel having alternating positions, the alternating positions being an extended position and a retracted position;
c) a left segmented upper side pivotal panel having a plurality of planar outer surfaces and attached in close proximity to the rear trailing edge of the left side segmented panel, the left segmented upper side pivotal panel having alternating positions, the alternating positions being an extended position and a retracted position;
d) a right drive means to provide for a selective transference of the right segmented upper side pivotal panel between the alternating positions;
e) a left drive means to provide for a selective transference of the left segmented upper side pivotal panel between the alternating positions;
f) a control means to provide for a selective activation of the main drive means, the right drive means and the left drive means to cause transference of the segmented pivotal panels, the right segmented upper side pivotal panel and the left segmented upper side pivotal panel between their respective alternating positions;

the auxiliary braking device providing fairing characteristics to stream line air flow around the trailer during motion of the tractor trailer combination to reduce drag while the segmented pivotal panels are in the closed position and the respective segmented upper side pivotal panels are in their respective extended positions, the auxiliary braking device having a continuous segmented surface area comprising a plurality of planar surfaces formed by the front segmented panel, the segmented pivotal panels, the right side segmented panel, the left side segmented panel, the right segmented upper side pivotal panel and the left segmented upper side pivotal panel while the segmented pivotal panels are in the closed position and the respective segmented upper side pivotal panels are in their respective extended positions, the auxiliary braking device providing redirection of the air flow to impinge the forward face of the tractor to produce drag by exerting a braking force on the tractor trailer combination while the segmented pivotal panels are in the open position and the respective segmented upper side pivotal panels are in their respective retracted positions;

whereby the auxiliary braking device acts as a fairing to stream line air flow around the trailer while the segmented pivotal panels are in the closed position and the respective segmented upper side pivotal panels are in their respective extended positions and redirects the air flow to impinge the forward face of the trailer to create drag while the segmented pivotal panels are in the open position and the respective segmented upper side pivotal panels are in their respective retracted positions.

8. The auxiliary braking device defined in claim 7 further comprising:

a) a wing member having:
  1) a leading edge;
  2) a trailing edge;
  3) a first surface having a convex shaped and extending from the leading edge to the trailing edge;
  4) a second surface comprising:
    a) an opposing convex surface extending from the leading edge on an opposing side from the first surface;
    b) a transition surface being concave shaped;
    c) a concave surface extending from the transition surface to the trailing edge, the transition surface being between the opposing convex surface and the concave surface;
b) attachment means to provide for elevated placement of the wing member above an attachment surface, the attachment surface an exposed surface of the auxiliary braking device;

whereby the wing member is attached to the auxiliary braking device and provides additional conditioning of the air flow.

9. The auxiliary braking device defined in claim 8 wherein the wing member is positioned transversely to one of the segmented pivotal panels to aid in conditioning of the air flow.

10. The auxiliary braking device defined in claim 8 wherein opposing wing members are positioned relatively vertically on each of the opposing segmented side panels in close proximity to the respective rear trailing edge to aid in conditioning of the air flow.

11. The auxiliary braking device defined in claim 8 further comprising pivotal variation means to provide for a selective alteration of an angle of attack of the wing member to aid in conditioning of the air flow.

12. The auxiliary braking device defined in claim 8 wherein opposing wing members are positioned relatively vertically on each of the opposing segmented upper side pivotal panels to aid in conditioning of the air flow.

13. The auxiliary braking device defined in claim 7 wherein the control means further provides for a monitoring for the presence of pressure on a brake pedal, the brake pedal engagable by the operator to activate the brakes of the tractor trailer combination, the pressure applied to the brake pedal causing transference of the segmented pivotal panels to the open position and the respective segmented upper side pivotal panels to their respective retracted position to redirect the air flow to impinge the forward face of the trailer to create drag to exert a braking force.

14. An auxiliary braking device for a tractor, the tractor adaptable to tow a trailer, the tractor and the trailer forming a tractor trailer combination, the tractor having a roof area, a direction of forward travel, a left and right directional orientation corresponding to a position facing forward in the direction of forward travel of the tractor, an imaginary center line extending through the tractor corresponding to the direction of forward travel, a tractor housing, a left rear vertically oriented trailing edge of the tractor housing, a right rear vertically oriented trailing edge of the tractor housing, the trailer having a forward face, the auxiliary braking device attachable to the roof area of the tractor, the auxiliary braking device having a directional orientation following attachment, the directional orientation including left, right, forward and rear and corresponding to the directional orientation of the tractor, the auxiliary braking device comprising:

a) a segmented air deflector comprising:
  1) a frame system;
  2) a front segmented panel having a plurality of planar outer surfaces and rigidly attached to the frame system, the front segmented panel substantially forming the front of the segmented air deflector;
  3) a plurality of segmented pivotal panels pivotally attached to the frame system in close proximity to the front segmented panel and extending rearward and upward from the front segmented panel, each segmented pivotal panel having a plurality of planar outer surfaces with a linear juncture between adjoining surfaces each segmented pivotal panels having alternating positions, the alternating positions being a closed position and an open position;
  4) a right side segmented panel having a plurality of planar outer surfaces and attached to the frame system and substantially filling the area between the segmented pivotal panels and the tractor on the right side of the segmented air deflector, the right side segmented panel having a rear trailing edge;
  5) a left side segmented panel having a plurality of planar outer surfaces and rigidly attached to the frame system and substantially filling the area between the segmented pivotal panels and the tractor on the left side of the segmented air deflector, the left side segmented panel having a rear trailing edge;
  6) a main drive means to provide for a selective transference of the segmented pivotal panels between the alternating positions;
b) a right segmented upper side pivotal panel having a plurality of planar outer surfaces and attached in close proximity to the rear trailing edge of the right side segmented panel, the right segmented upper side pivotal panel having alternating positions, the alternating positions being an extended position and a retracted position;
c) a left segmented upper side pivotal panel having a plurality of planar outer surfaces and attached in close proximity to the rear trailing edge of the left side segmented panel, the left segmented upper side pivotal panel having alternating positions, the alternating positions being an extended position and a retracted position;

d) a right segmented lower side pivotal panel having a plurality of planar outer surfaces and attached in close proximity to the right rear vertically oriented trailing edge of the tractor housing, the right segmented lower side pivotal panel having alternating positions, the alternating positions being an extended position and a retracted position;

e) a left segmented lower side pivotal panel having a plurality of planar outer surfaces and attached in close proximity to the left rear vertically oriented trailing edge of the tractor housing, the left segmented lower side pivotal panel having alternating positions, the alternating positions being an extended position and a retracted position;

f) a first right drive means to provide for a selective transference of the right segmented upper side pivotal panel between the alternating positions;

g) a first left drive means to provide for a selective transference of the left segmented upper side pivotal panel between the alternating positions;

h) a second right drive means to provide for a selective transference of the right segmented lower side pivotal panel between the alternating positions;

i) a second left drive means to provide for a selective transference of the left segmented lower side pivotal panel between the alternating positions;

j) a control means to provide for a selective activation of the main drive means, the first right drive means, the first left drive means, the second right drive means and the second left drive means to cause transference of the segmented pivotal panels, the right segmented upper side pivotal panel, the left segmented upper side pivotal panel, the right segmented lower side pivotal panel and the left segmented lower side pivotal panel between their respective alternating positions;

the auxiliary braking device providing fairing characteristics to stream line air flow around the trailer during motion of the tractor trailer combination to reduce drag while the segmented pivotal panels are in the closed position, the respective segmented upper side pivotal panels are in their respective extended positions and the respective segmented lower side pivotal panels are in their respective extended positions, the auxiliary braking device having a continuous segmented surface area having a plurality of planar surfaces formed by the front segmented panel, the segmented pivotal panels, the right side segmented panel, the left side segmented panel, the right segmented upper side pivotal panel and the left segmented upper side pivotal panel while the segmented pivotal panels are in the closed position and the respective segmented upper side pivotal panels are in their respective extended positions, the auxiliary braking device providing redirection of the air flow to impinge the forward face of the tractor to produce drag by exerting a braking force on the tractor trailer combination while the segmented pivotal panels are in the open position, the respective segmented upper side pivotal panels are in their respective retracted positions and the respective segmented lower side pivotal panels are in their respective retracted positions;

whereby the auxiliary braking device acts as a fairing to stream line air flow around the trailer while the segmented pivotal panels are in the closed position, the respective segmented upper side pivotal panels are in their respective extended positions and the respective segmented lower side pivotal panels are in their respective extended positions and redirects the, air flow to impinge the forward face of the trailer to create drag while the segmented pivotal panels are in the open position, the respective segmented upper side pivotal panels are in their respective retracted positions and the respective segmented lower side pivotal panels are in their respective retracted positions.

15. The auxiliary braking device defined in claim 14 further comprising:
   a) a wing member having:
      1) a leading edge;
      2) a trailing edge;
      3) a first surface having a convex shaped and extending from the leading edge to the trailing edge;
      4) a second surface comprising:
         a) an opposing convex surface extending from the leading edge on an opposing side from the first surface;
         b) a transition surface being concave shaped;
         c) a concave surface extending from the transition surface to the trailing edge, the transition surface being between the opposing convex surface and the concave surface;
   b) attachment means to provide for elevated placement of the wing member above an attachment surface, the attachment surface an exposed surface of the auxiliary braking device;
   whereby the wing member is attached to the auxiliary braking device and provides additional conditioning of the air flow.

16. The auxiliary braking device defined in claim 15 wherein the wing member is positioned transversely to one of the segmented pivotal panels to aid in conditioning of the air flow.

17. The auxiliary braking device defined in claim 15 wherein opposing wing members are positioned relatively vertically on each of the opposing segmented side panels in close proximity to the respective rear trailing edge to aid in conditioning of the air flow.

18. The auxiliary braking device defined in claim 15 further comprising pivotal variation means to provide for a selective alteration of an angle of attack of the wing member to aid in conditioning of the air flow.

19. The auxiliary braking device defined in claim 15 wherein opposing wing members are positioned relatively vertically on each of the opposing segmented lower side pivotal panels to aid in conditioning of the air flow.

20. The auxiliary braking device defined in claim 14 wherein the control means further provides for a monitoring for the presence of pressure on a brake pedal, the brake pedal engagable by the operator to activate the brakes of the tractor trailer combination, the pressure applied to the brake pedal causing transference of the segmented pivotal panels to the open position, the respective segmented upper side pivotal panels to their respective retracted position and the respective segmented lower side pivotal panels to their respective retracted position to redirect the air flow to impinge the forward face of the trailer to create drag to exert a braking force.

* * * * *